(12) United States Patent
Kim et al.

(10) Patent No.: US 11,121,673 B2
(45) Date of Patent: Sep. 14, 2021

(54) SOLAR CELL MODULE FOR A VEHICLE PANEL AND A VEHICLE PANEL ASSEMBLY INCLUDING A SOLAR CELL MODULE

(71) Applicants: HYUNDAI MOTOR COMPANY, Seoul (KR); KIA MOTORS CORPORATION, Seoul (KR)

(72) Inventors: Sol Kim, Suwon-si (KR); Sang Hak Kim, Seoul (KR); Mi Yeon Song, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 245 days.

(21) Appl. No.: 16/375,495

(22) Filed: Apr. 4, 2019

(65) Prior Publication Data

US 2020/0207213 A1 Jul. 2, 2020

(30) Foreign Application Priority Data

Dec. 26, 2018 (KR) .......................... 10-2018-0169614

(51) Int. Cl.
| | | |
|---|---|---|
| *H02S 30/10* | (2014.01) | |
| *B60L 8/00* | (2006.01) | |
| *H02S 20/30* | (2014.01) | |
| *H02S 10/40* | (2014.01) | |
| *B60L 53/51* | (2019.01) | |
| *H02J 7/35* | (2006.01) | |
| *B60K 16/00* | (2020.01) | |

(52) U.S. Cl.
CPC ............. *H02S 30/10* (2014.12); *B60L 8/003* (2013.01); *B60L 53/51* (2019.02); *H02J 7/35* (2013.01); *H02S 10/40* (2014.12); *H02S 20/30* (2014.12); *B60K 2016/003* (2013.01)

(58) Field of Classification Search
CPC ....................................................... H02S 30/10
USPC ............................................................ 320/101
See application file for complete search history.

(56) References Cited

U.S. PATENT DOCUMENTS 5,154,481 A * 10/1992 Paetz ................. B60H 1/00428
296/211
6,155,635 A * 12/2000 Wecker .................... B60J 7/003
296/211

(Continued)

FOREIGN PATENT DOCUMENTS

| KR | 200474466 | 9/2014 |
|---|---|---|
| KR | 101637717 | 7/2016 |
| KR | 101767340 | 8/2017 |

*Primary Examiner* — Jerry D Robbins
(74) *Attorney, Agent, or Firm* — Lempia Summerfield Katz LLC

(57) ABSTRACT

A solar cell module for a vehicle panel includes a solar cell that generates electric power using sunlight. The solar cell module further includes a connector that is electrically connected to the solar cell and that electrically connects a panel-side electrode formed on an inner surface of the vehicle panel and the solar cell. The connector extends from the solar cell in a coupling direction in which the solar cell is combined with the vehicle panel. The connector is connected to the panel-side electrode to electrically connect the panel-side electrode and the solar cell when the solar cell is mounted in a predetermined position of the vehicle panel.

12 Claims, 7 Drawing Sheets

(56) References Cited

U.S. PATENT DOCUMENTS

| | | | |
|---|---|---|---|
| 6,485,090 B1* | 11/2002 | Patz | B60J 7/003 |
| | | | 296/211 |
| 8,348,336 B2* | 1/2013 | De Bie | B60J 7/0084 |
| | | | 296/211 |
| 9,573,449 B2* | 2/2017 | Park | B60J 7/043 |
| 9,579,957 B2* | 2/2017 | Park | B60J 7/0573 |
| 9,641,124 B2 | 5/2017 | Eo | |
| 2012/0048349 A1 | 3/2012 | Metin et al. | |
| 2016/0126886 A1 | 5/2016 | Eo | |
| 2018/0166601 A1 | 6/2018 | Inaba | |

* cited by examiner

SOLAR CELL MODULE FOR A VEHICLE PANEL AND A VEHICLE PANEL ASSEMBLY INCLUDING A SOLAR CELL MODULE

CROSS-REFERENCE TO RELATED APPLICATION

This application claims the benefit of priority to Korean Patent Application No. 10-2018-0169614, filed in the Korean Intellectual Property Office on Dec. 26, 2018, the entire contents of which are incorporated herein by reference.

TECHNICAL FIELD

The present disclosure relates to a solar cell module for a vehicle panel and a vehicle panel assembly including the solar cell module.

BACKGROUND

Various components of a vehicle mechanically operated in the related art are electronically operated and the vehicle includes various electronic devices. Thereby, the power consumption of the vehicle may be considerably increased.

Accordingly, an auxiliary power source, in addition to a main power source such as a vehicle battery, may be mounted to a vehicle. For example, a solar cell module may be mounted to the vehicle.

In this example, the solar cell module may be mounted on a panel of the vehicle, such as a hood, a trunk door, or a roof.

In the related art, when mounting the solar cell module on the panel of the vehicle, the solar cell module is laminated on the surface of a steel sheet panel. Additionally, an electrode structure in which the solar cell module is connected to the vehicle body by a commonly used wire is used.

However, in this case, the manufacturing method is complex and it is difficult to install leads or wires for electrical connection between the solar cell module and the vehicle through a space inward of the vehicle panel constituted by a plurality of plates.

SUMMARY

The present disclosure has been made to solve the above-mentioned problems occurring in the prior art while advantages achieved by the prior art are maintained intact.

An aspect of the present disclosure provides a solar cell module that is easy to mount on a vehicle panel and capable of stably securing an electrical connection with an electrode of the vehicle panel. An aspect of the present disclosure further provides a vehicle panel assembly including the solar cell module.

The technical problems to be solved by the present disclosure are not limited to the aforementioned problems. Any other technical problems not mentioned herein will be clearly understood from the following description by a person having ordinary skill in the art to which the present disclosure pertains.

According to an aspect of the present disclosure, a solar cell module for a vehicle panel includes a solar cell that generates electric power using sunlight. The solar cell module further includes a connector that is electrically connected to the solar cell and that electrically connects a panel-side electrode formed on an inner surface of the vehicle panel and the solar cell.

The connector extends from the solar cell in a coupling direction in which the solar cell is combined with the vehicle panel.

According to the solar cell module, the connector is connected to the panel-side electrode to electrically connect the panel-side electrode and the solar cell when the solar cell is mounted in a predetermined position of the vehicle panel.

According to another aspect of the present disclosure, a vehicle panel assembly includes a solar cell module. The vehicle panel assembly further includes an upper panel, a lower panel spaced apart from the upper panel to form an inner space between the upper panel and the lower panel, and the solar cell module mounted in a mounting portion formed in the upper panel. The solar cell module is combined with the upper panel.

The solar cell module includes a solar cell that generates electric power using sunlight. The solar cell module further includes a connector that is electrically connected to the solar cell and that electrically connects a panel-side electrode formed on an inner surface of the upper panel and the solar cell.

The connector extends from the solar cell in a coupling direction in which the solar cell is combined with the upper panel. The connector includes a portion that protrudes in a direction perpendicular to the coupling direction.

According to an aspect of the vehicle panel assembly including the solar cell module, the protruding portion of the connector is stopped by the inner surface of the upper panel to prevent the solar cell from being separated from the upper panel and maintain the electrical connection between the solar cell and the panel-side electrode when the solar cell is mounted in the mounting portion of the upper panel.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
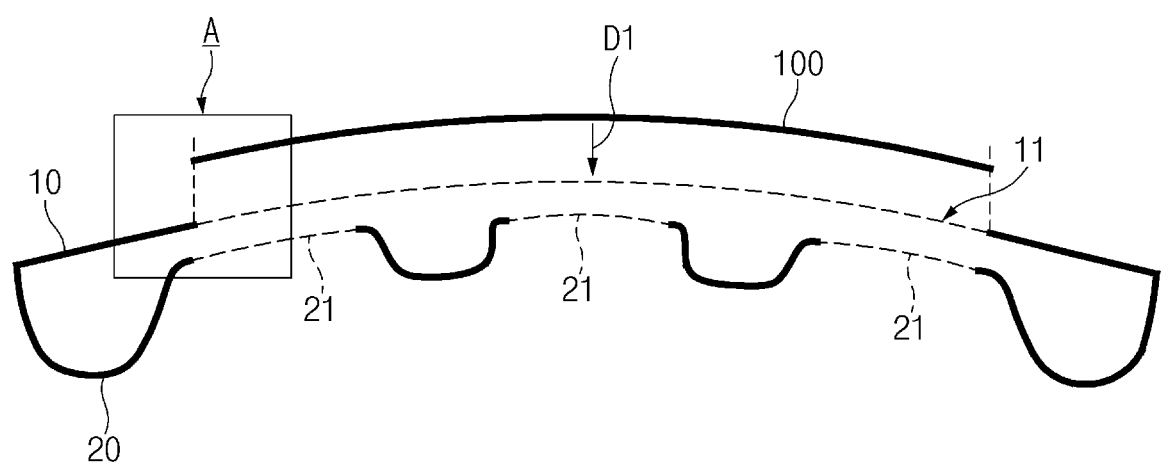
FIG. 1 is a schematic vertical sectional view illustrating a vehicle panel assembly including a solar cell module according to an embodiment of the present disclosure.

Hereinafter, various embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)" "(b)", and the like, may be used herein to describe components of the present disclosure. Such terms are only used to distinguish one component from another component, and the substance, sequence, order, or number of these components is not limited by these terms. If a component were described as "connected", "coupled", or "linked" to another component, they may mean the components are not only directly "connected", "coupled", or "linked" but also are indirectly "connected", "coupled", or "linked" via a third component.

FIG. 1 is a schematic sectional view illustrating a vehicle panel assembly. The vehicle panel assembly includes a solar cell module according to an embodiment of the present disclosure.

Referring to FIG. 1, the vehicle panel assembly according to this embodiment includes an upper panel 10, a lower panel 20, and a solar cell module 100.

The upper panel 10 and the lower panel 20 may be combined together so as to be spaced apart from each other to form an inner space therebetween. The upper panel 10 and the lower panel 20 may be formed of a steel sheet and may have strength suitable for a vehicle panel.

The upper panel 10 may include a mounting portion 11 in which the solar cell module 100 is mounted.

The lower panel 20 may include one or more lower-panel holes 21 formed through one side and the other side of the lower panel 20 to improve the structural strength of the lower panel 20. For example, the lower-panel holes 21 may have a circular shape.

The solar cell module 100 may be moved in a coupling direction D1 toward the mounting portion 11 of the upper panel 10 and may be mounted in the mounting portion 11 of the upper panel 10.

Figure 2:
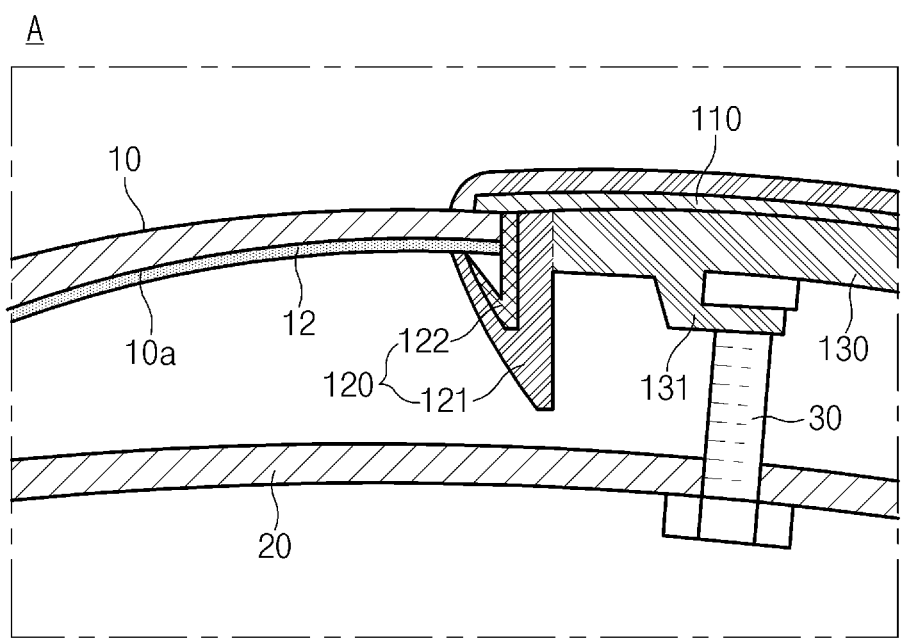
FIG. 2 is a blowup of detail "A" in FIG. 1, where the solar cell module is mounted on a vehicle panel.

FIG. 2 is a blowup of detail "A" in FIG. 1, where the solar cell module is mounted on the vehicle panel.

Referring to FIG. 2, the upper panel 10 may have a panel-side electrode 12 on an inner surface 10a thereof. The inner surface 10a of the upper panel 10 may be defined as a surface of the upper panel 10 that faces the lower panel 20.

The panel-side electrode 12 may deliver electric power generated by the solar cell module 100 to a vehicle. To this end, the panel-side electrode 12 may be electrically connected to the solar cell module 100 on one side thereof and may be electrically connected to an electronic device of the vehicle on an opposite side thereof. The panel-side electrode 12, except for the portion connected to an electrode that extends from the solar cell module 100, may be insulated.

The solar cell module 100 includes a solar cell 110 and connectors 120.

The solar cell 110 generates electric power using sunlight. The solar cell 110 may be appropriately selected from various well-known solar cells in the related art.

The connectors 120 may be electrically connected to the solar cell 110 and may electrically connect the panel-side electrode 12, which is formed on the inner surface 10a of the upper panel 10, and the solar cell 110.

The connectors 120 may extend from the solar cell 110 in the coupling direction D1. Each of the connectors 120 may include a portion that protrudes in a direction perpendicular to the coupling direction D1.

Since components of a vehicle mechanically operated in the related art are electronically operated and the vehicle includes various electronic devices, the power consumption of the vehicle is considerably increased. Accordingly, an auxiliary power source, in addition to a main power source such as a vehicle battery, may be added to the vehicle. For example, a solar cell module may be added to the vehicle.

In this case, the solar cell module 100 may be mounted on a panel of the vehicle, such as a hood, a trunk door, or a roof.

By mounting the solar cell module on the vehicle panel in the related art, the panel and the solar cell module may be integrated with each other. However, in this case, the manufacturing method is complex. Additionally, it is difficult to install leads or wires for electrical connection between the solar cell module and the vehicle through a space inward of the vehicle panel constituted by a plurality of plates.

The solar cell module 100 according to this embodiment is easy to mount on the vehicle panel and may stably secure electrical connection. More specifically, the solar cell module 100 according to this embodiment has a basic feature wherein the solar cell module 100 includes the connectors 120 for electrically connecting the panel-side electrode 12 formed on the inner surface of the vehicle panel and the solar cell 110. The connectors 120 extend from the solar cell 110 in the coupling direction D1 in which the solar cell 110 is combined with the vehicle panel. The connectors 120 include the protruding portion perpendicular to the coupling direction D1.

According to the above-configured solar cell module 100, when the solar cell 110 is mounted in the mounting portion 11, the protruding portions of the connectors 120 may be stopped or locked by the inner surface 10a of the upper panel 10 and the protruding portions of the connectors 120 contact the inner surface 10a of the upper panel 10. Thereby, the protruding portions of the connectors 120 may maintain the electrical connection between the solar cell 110 and the panel-side electrode 12 at the same time as preventing the solar cell 110 from being separated from the upper panel 10.

Features of the solar cell module 100 according to this embodiment will be described below in more detail.

Referring to FIG. 2, each of the connectors 120 includes a connector housing 121 and a connector electrode 122.

The connector 120 may have elasticity such that at least a portion thereof is combined with the upper panel 10 in a snap-fit manner while being deformed and then restored in the process in which the solar cell 110 is combined with the upper panel 10 in the coupling direction D1. For example, the connector 120 may be formed of a material that includes plastic or a polymer with elasticity.

The connector housing 121 may extend from an inner surface of the solar cell 110 in the coupling direction D1. The connector housing 121 may have an inner space.

The connector electrode 122 may be accommodated in the inner space of the connector housing 121.

The connector electrode 122 may connect the solar cell 110 and the panel-side electrode 12 together. The connector electrode 122 may be connected to the solar cell 110 on one side thereof. The connector electrode 122 may be connected to the panel-side electrode 12 when the solar cell 110 is mounted in the mounting portion 11 of the upper panel 10.

Although not illustrated, the connector electrode 122 may have a shape that extends in the coupling direction D1, but does not protrude in a direction perpendicular to the coupling direction D1. In other words, the connector electrode 122 may be formed in a plate shape when viewed as a whole. In this case, the connector electrode 122 may be brought into contact with a distal end of the panel-side electrode 12 when the solar cell module 100 is mounted in the mounting portion 11 of the upper panel 10. To this end, the panel-side electrode 12 may extend to the mounting portion 11 on the inner surface 10a of the upper panel 10. Accordingly, the solar cell module 100 may be inserted into the mounting portion 11 in the coupling direction D1 without being obstructed by the protrusion of the connector electrode 122.

The solar cell 110 may include one or more photovoltaic cells for generating electric power using sunlight and solar cell wires 111 for supplying the electric power generated by the photovoltaic cells to the outside. The solar cell wires 111 may be inserted into the connector housings 121 and connected to the connector electrodes 122.

Figure 3A:
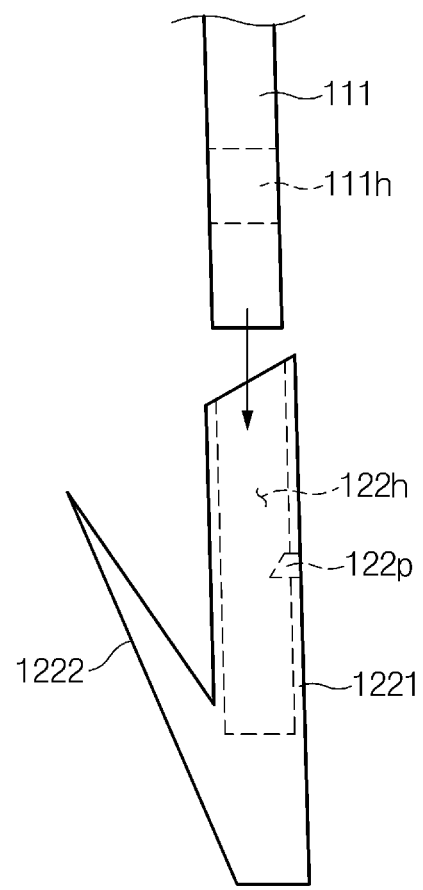
FIGS. 3A and 3B are views illustrating connector electrodes of the solar cell module according to embodiments of the present disclosure.
Figure 3B:
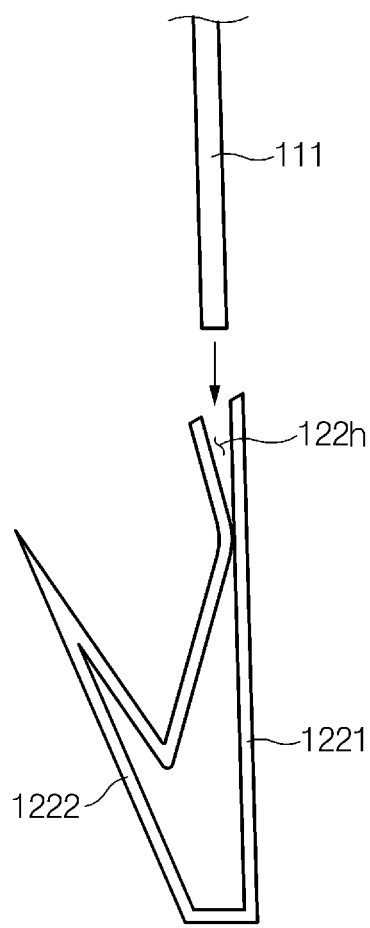

FIGS. 3A and 3B are views illustrating connector electrodes of the solar cell module according to embodiments of the present disclosure.

Referring to FIG. 3A, in an embodiment, the connector electrode 122 may include an insertion hole 122h into which the solar cell wire 111 is inserted. The connector electrode 122 may include a support pin 122p formed in the insertion hole 122h to prevent the solar cell wire 111 inserted into the insertion hole 122h from being separated from the insertion hole 122h.

The support pin 122p may press the solar cell wire 111, which is inserted into the insertion hole 122h of the connector electrode 122, to suppress the solar cell wire 111 from being separated from the insertion hole 122h.

In an embodiment, the solar cell wire 111 may include a wire hole 111h formed in a portion of the solar cell wire 111 that is inserted into the insertion hole 122h. Accordingly, when the solar cell wire 111 is inserted into the insertion hole 122h, the support pin 122p may pass through the wire hole 111h to effectively prevent the solar cell wire 111 from being separated from the insertion hole 122h of the connector electrode 122. As a result, the electrical connection between the solar cell wire 111 and the connector electrode 122 may be stably maintained.

The connector electrode 122 may include a connector electrode extension 1221 extending in the coupling direction D1 and a connector electrode hook 1222 extending from one end of the connector electrode extension 1221.

FIG. 3A illustrates an example in which the connector electrode hook 1222 has a wedge shape. However, the shape of the connector electrode hook 1222 is not limited thereto. Additionally, any shape protruding from the connector electrode extension 1221 and capable of making contact with the panel-side electrode 12 when the solar cell module 100 is mounted on and combined with the upper panel 10 may be used for the connector electrode hook 1222.

For example, as illustrated in FIG. 3A, the connector electrode hook 1222 may have a triangular shape when viewed from a side and may have a wide contact area with the panel-side electrode 12.

Referring to FIG. 3B, in another embodiment, the connector electrode 122 may have a shape in which one plate is bent in a wedge shape. In other words, the connector electrode 122 may be implemented in a tweezer type.

The connector electrode 122 may include the insertion hole 122h into which the solar cell wire 111 is inserted. When the solar cell wire 111 is inserted through the insertion hole 122h, the connector electrode 122 may be elastically deformed to allow the insertion of the solar cell wire 111.

The solar cell wire 111 inserted into the insertion hole 122h of the connector electrode 122 may be pressed by the elasticity of the connector electrode 122 itself and may be suppressed from being separated from the insertion hole 122h.

The connector electrode 122 may have various shapes, in addition to the shapes described with reference to FIGS. 3A and 3B, to connect the solar cell wire 111 and the panel-side electrode 12. For example, the connector electrode 122 may be implemented in various ways such as a pin, tongs, a clip, and the like.

Figure 4:
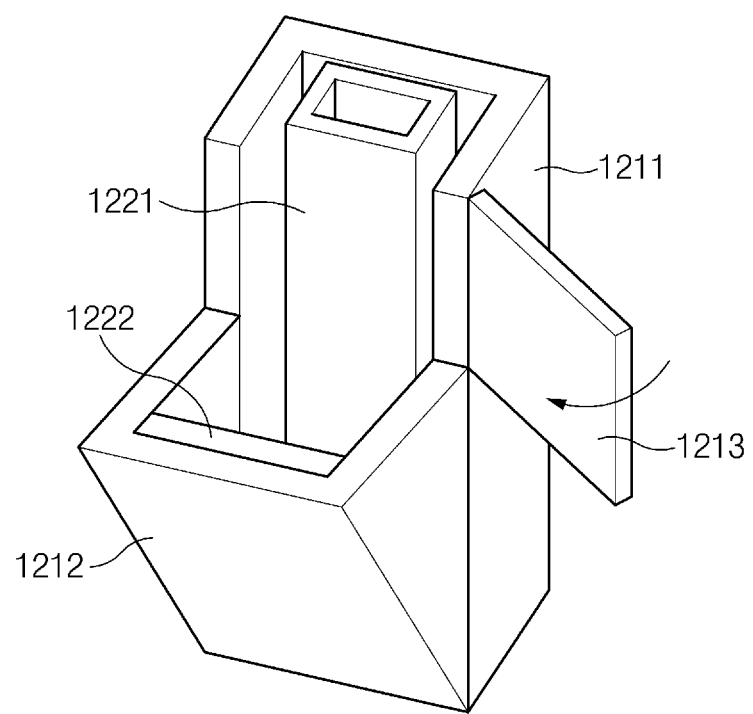
FIGS. 4 and 5 are views illustrating connectors of the solar cell module according to embodiments of the present disclosure.
Figure 5:
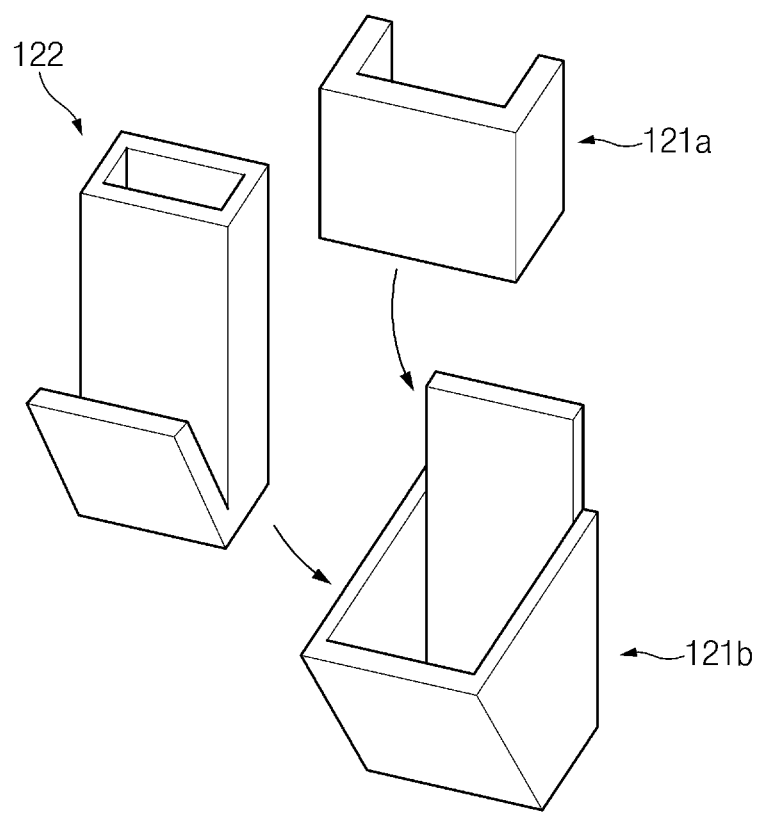

FIGS. 4 and 5 are views illustrating connectors of the solar cell module according to embodiments of the present disclosure.

Referring to FIG. 4, the connector housing 121 (shown in FIG. 2) according to an embodiment of the present disclosure may include a connector housing body 1211 extending in the coupling direction D1 and a connector housing protrusion 1212 protruding from the connector housing body 1211 in a direction perpendicular to the coupling direction D1.

The connector housing body 1211 may have a substantially rectangular parallelepiped shape with an empty space inside. The connector housing body 1211 may be open in the direction toward the solar cell 110 (the upper direction in FIG. 4) and in the direction toward the panel-side electrode 12 (the direction in which the connector housing protrusion 1212 is disposed in FIG. 4). Additionally, the connector electrode 122 (shown in FIG. 2) may be inserted into and combined with the connector housing 121 through the openings of the connector housing body 1211.

The connector electrode 122 may include the connector electrode extension 1221 extending in the coupling direction D1 and the connector electrode hook 1222 extending from the one end of the connector electrode extension 1221.

The connector electrode extension 1221 may be accommodated in the inner space of the connector housing 121.

The connector electrode hook 1222 may be bent at the one end of the connector electrode extension 1221. The connector electrode hook 1222 may be located on the connector housing protrusion 1212.

The connector housing protrusion 1212 may have an inclined surface that is downwardly inclined toward the inner space of the connector housing body 1211. In other words, the connector housing protrusion 1212 may be formed in a plate shape and may be connected to one end of the connector housing body 1211.

The connector housing protrusion 1212 may have a shape that includes an inclined plate having an inclined surface and a side plate connecting the inclined plate and the connector housing body 1211.

The connector electrode hook 1222 may be bent at the one end of the connector electrode extension 1221. The connector electrode hook 1222 may be located on the inclined surface of the connector housing protrusion 1212.

According to the above-configured connector 120, the connector electrode hook 1222 may be supported toward and brought into contact with the panel-side electrode 12 by the connector housing protrusion 1212.

The connector housing 121 may further include a connector housing cover 1213 for covering the opening of the connector housing body 1211 that is open toward the panel-side electrode 12.

The connector housing cover 1213 may be hinged to the connector housing body 1211 at one end thereof.

With the connector electrode 122 inserted into the connector housing body 1211, the connector housing cover 1213 may cover the opening of the connector housing body 1211, thereby preventing foreign matter from being introduced into the connector housing body 1211 and suppressing the connector electrode 122 from being separated from the connector housing body 1211.

The connector electrode 122 in a tweezer shape, such as that illustrated in FIG. 3B, may be applied to the connector electrode 122 of FIG. 4.

Referring to FIG. 5, the connector housing 121 (shown in FIG. 2) may include a first connector housing 121a and a second connector housing 121b. The connector housing 121 may be formed by combining the first connector housing 121*a* and the second connector housing 121*b*.

In an embodiment, the first connector housing 121*a* may have a shape in which three plates are combined together. In other words, the first connector housing 121*a* may have a shape in which side plates are connected to opposite sides of a central plate located in the middle. In other words, the first connector housing 121*a* may have a shape in which one side is removed from a hollow rectangular prism, or the shape of "⊏", when viewed as a whole.

In an embodiment, the second connector housing 121*b* may have a shape corresponding to inner surfaces of the first connector housing 121*a* so as to be inserted into the first connector housing 121*a*. The second connector housing 121*b* may include a mounting surface on which the connector electrode 122 is mounted.

The second connector housing 121*b* may include a protrusion that protrudes outside the first connector housing 121*a* in the state in which the second connector housing 121*b* is combined with the first connector housing 121*a*. The protrusion of the second connector housing 121*b* may have a mounting surface on which the connector electrode 122 is mounted and that is inclined at a predetermined angle with respect to a side surface of the first connector housing 121*a*.

In regard to a process of combining the connector housing 121 and the connector electrode 122, the connector electrode 122 is first combined with the second connector housing 121*b*. Thereafter, the first connector housing 121*a* is combined with the second connector housing 121*b* to form the connector 120 with the connector electrode 122 and the second connector housing 121 combined with each other.

Accordingly, the connector electrode 122 may be surrounded by the connector housing 121 in all directions and may be protected from foreign matter or external impacts.

The connector electrode 122 in a tweezer shape, such as illustrated in FIG. 3B, may be applied to the connector electrode 122 of FIG. 5.

Figure 6:
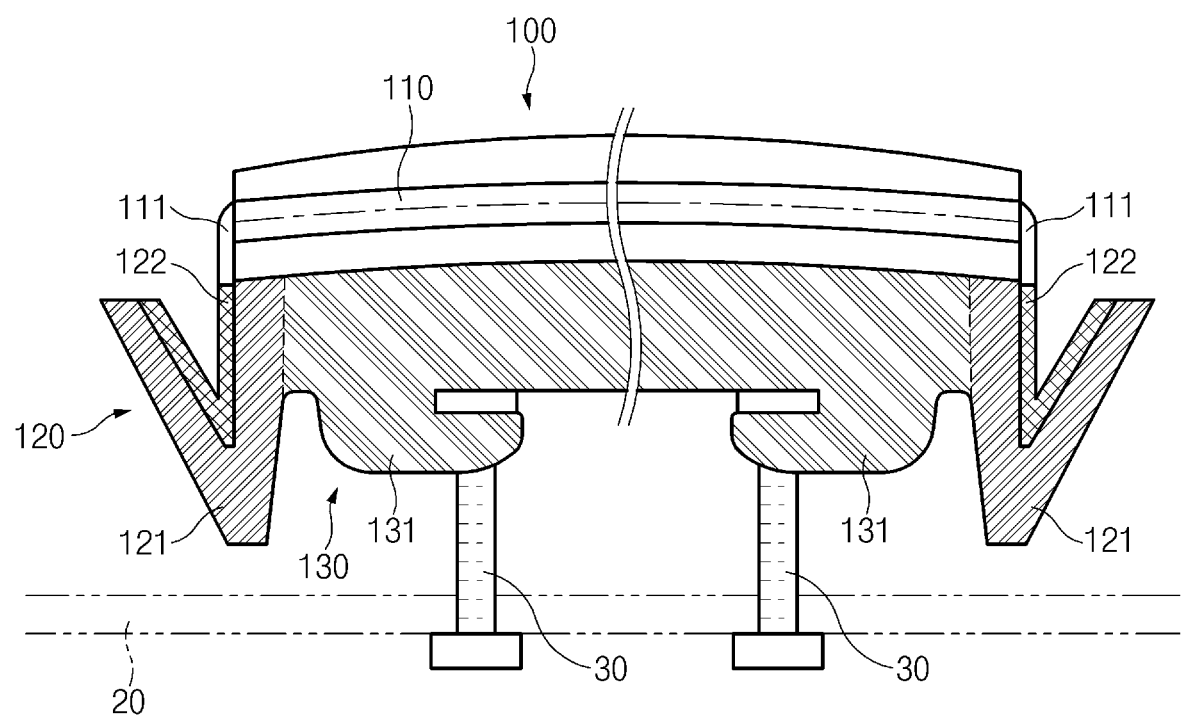
FIG. 6 is a schematic sectional view illustrating the solar cell module according to an embodiment of the present disclosure.

FIG. 6 is a schematic vertical sectional view illustrating the solar cell module according to an embodiment of the present disclosure.

Referring to FIG. 6, the solar cell module 100 may include a pair of connectors 120 (shown in FIG. 2). The pair of connectors 120 may be connected to a positive (+) electrode and a negative (−) electrode of the solar cell 110.

The solar cell module 100 may further include a panel coupling part 130 formed between the pair of connectors 120. The panel coupling part 130 may be formed between the pair of connectors 120 by injection molding, with the pair of connectors 120 combined with the solar cell 110.

An injection mold for the panel coupling part 130 may have a cavity formed therein, in which the solar cell 110 and the pair of connectors 120 combined with the solar cell 110 are seated.

Accordingly, when the solar cell 110 is seated on the injection mold in the manufacturing process of the solar cell module 100, the position of the solar cell 110 may be guided by the pair of connectors 120 combined with the solar cell 110 in advance. Furthermore, when the panel coupling part 130 is formed by filling the injection mold with a filler (e.g., a resin), the area that is filled with the filler may be restricted by the pair of connectors 120. Accordingly, the panel coupling part 130 may be efficiently formed.

Moreover, the panel coupling part 130 may be bonded to and integrated with the connectors 120.

The components of the solar cell module 100, including the solar cell 110, the connectors 120, and the panel coupling part 130, may be firmly bonded together.

The panel coupling part 130 may include fastening parts 131 for combination with the lower panel 20.

Referring again to FIGS. 2 and 6, the fastening parts 131 of the panel coupling part 130 and the lower panel 20 may be combined together by fastening members 30. Accordingly, the solar cell module 100 may be prevented from being separated from the upper panel 10 and the lower panel 20. The structural strength of the vehicle panel assembly including the solar cell module 100, the upper panel 10, and the lower panel 20 may be improved.

According to various embodiments of the present disclosure, at least the following effects are achieved.

The connector extends from the solar cell in the coupling direction in which the solar cell is combined with the vehicle panel and includes the portion protruding in the perpendicular direction to the coupling direction. Accordingly, when the solar cell is mounted in the predetermined position of the vehicle panel, the protruding portion of the connector is stopped by the inner surface of the vehicle panel, thereby preventing the solar cell from being separated from the vehicle panel.

In addition, the solar cell module may stably maintain the electrical connection between the solar cell and the panel-side electrode.

Effects of the present disclosure are not limited to the aforementioned effects. Any other effects not mentioned herein will be clearly understood from the accompanying claims by a person having ordinary skill in the art to which the present disclosure pertains.

Hereinabove, although the present disclosure has been described with reference to various embodiments and the accompanying drawings, the present disclosure is not limited thereto, but may be variously modified and altered by a person having ordinary skill in the art to which the present disclosure pertains without departing from the spirit and scope of the present disclosure claimed in the following claims.

What is claimed is:

1. A solar cell module for a vehicle panel, the solar cell module comprising:
    a solar cell configured to generate electric power using sunlight; and
    a connector electrically connected to the solar cell and configured to electrically connect a panel-side electrode formed on an inner surface of the vehicle panel and the solar cell,
    wherein the connector extends from the solar cell in a coupling direction in which the solar cell is combined with the vehicle panel,
    wherein the connector is connected to the panel-side electrode to electrically connect the panel-side electrode and the solar cell when the solar cell is mounted in a predetermined position of the vehicle panel,
    wherein the connector includes a protruding portion that protrudes in a direction perpendicular to the coupling direction, and
    wherein the protruding portion of the connector is stopped by the inner surface of the vehicle panel to prevent the solar cell from being separated from the vehicle panel and to maintain the electrical connection between the solar cell and the panel-side electrode when the solar cell is mounted in the predetermined position of the vehicle panel.

2. The solar cell module of claim 1, wherein the connector has elasticity such that at least a portion of the connector is combined with the vehicle panel in a snap-fit manner while being deformed and then restored in a process in which the solar cell is combined with the vehicle panel in the coupling direction.

3. The solar cell module of claim 1, wherein the connector includes:
- a connector housing extending from an inner surface of the solar cell in the coupling direction and having an inner space; and
- a connector electrode accommodated in the inner space of the connector housing and connected to the solar cell, wherein the connector electrode is connected to the panel-side electrode to electrically connect the solar cell and the panel-side electrode when the solar cell is mounted in the predetermined position of the vehicle panel.

4. The solar cell module of claim 3, wherein the solar cell includes:
- one or more photovoltaic cells configured to generate electric power using sunlight; and
- a solar cell wire configured to supply the electric power generated by the photovoltaic cells to the outside, and
- wherein the solar cell wire is inserted into the connector housing and connected to the connector electrode.

5. The solar cell module of claim 4, wherein the connector electrode includes:
- an insertion hole into which the solar cell wire is inserted; and
- a support pin formed in the insertion hole to prevent the solar cell wire inserted into the insertion hole from being separated from the insertion hole.

6. The solar cell module of claim 5, wherein the solar cell wire includes, in a portion inserted into the insertion hole, a hole through which the support pin passes when the solar cell wire is inserted into the insertion hole.

7. The solar cell module of claim 3, wherein the connector housing includes:
- a connector housing body extending in the coupling direction; and
- a connector housing protrusion protruding from the connector housing body in a direction perpendicular to the coupling direction,
- wherein the connector electrode includes:
- a connector electrode extension extending in the coupling direction, the connector electrode extension being accommodated in the inner space of the connector housing; and
- a connector electrode hook extending from one end of the connector electrode extension, the connector electrode hook being located on the connector housing protrusion, and
- wherein the connector electrode hook is supported toward and brought into contact with the panel-side electrode by the connector housing protrusion.

8. The solar cell module of claim 7, wherein the connector housing protrusion has an inclined surface that is downwardly inclined toward the inner space of the connector housing, and
wherein the connector electrode hook is bent at the one end of the connector electrode extension and is located on the inclined surface of the connector housing protrusion.

9. The solar cell module of claim 7, wherein the connector housing body has a substantially rectangular parallelepiped shape with an empty space inside and is open in a direction toward the solar cell and in a direction toward the panel-side electrode, and
wherein the connector electrode is inserted through an opening of the connector housing body.

10. The solar cell module of claim 9, wherein the connector housing further includes:
- a connector housing cover configured to cover a portion of the connector housing body that is open toward the panel-side electrode.

11. The solar cell module of claim 1, wherein the connector includes a pair of connectors,
wherein the solar cell module further comprises a panel coupling part formed between the pair of connectors by injection molding, with the pair of connectors combined with the solar cell, and
wherein the panel coupling part includes a fastening part for combination with the vehicle panel.

12. A vehicle panel assembly including a solar cell module, the vehicle panel assembly comprising:
- an upper panel;
- a lower panel spaced apart from the upper panel to form an inner space between the upper panel and the lower panel; and
- the solar cell module mounted in a mounting portion formed in the upper panel, the solar cell module being combined with the upper panel,
- wherein the solar cell module includes:
- a solar cell configured to generate electric power using sunlight; and
- a connector electrically connected to the solar cell and configured to electrically connect a panel-side electrode formed on an inner surface of the upper panel and the solar cell,
- wherein the connector extends from the solar cell in a coupling direction in which the solar cell is combined with the upper panel, and includes a protruding portion that protrudes in a direction perpendicular to the coupling direction, and
- wherein the protruding portion of the connector is stopped by the inner surface of the upper panel to prevent the solar cell from being separated from the upper panel and maintain the electrical connection between the solar cell and the panel-side electrode when the solar cell is mounted in the mounting portion of the upper panel.

* * * * *